July 8, 1958 H. J. OLSON 2,842,150
VALVE DEVICE RESPONSIVE TO FLUID FLOW
Filed Dec. 29, 1955
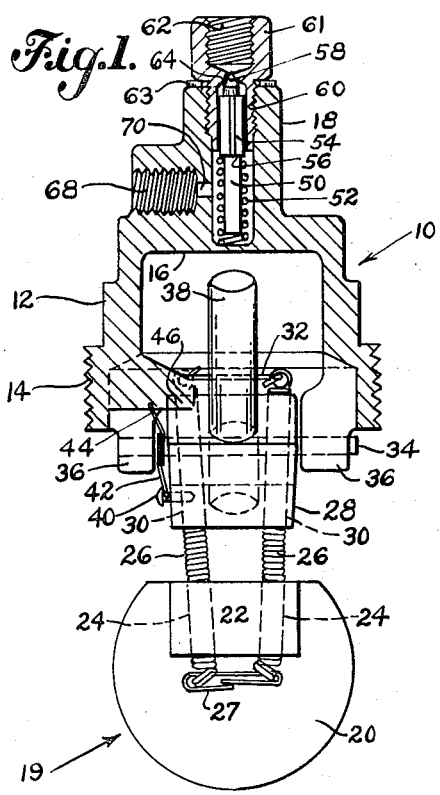
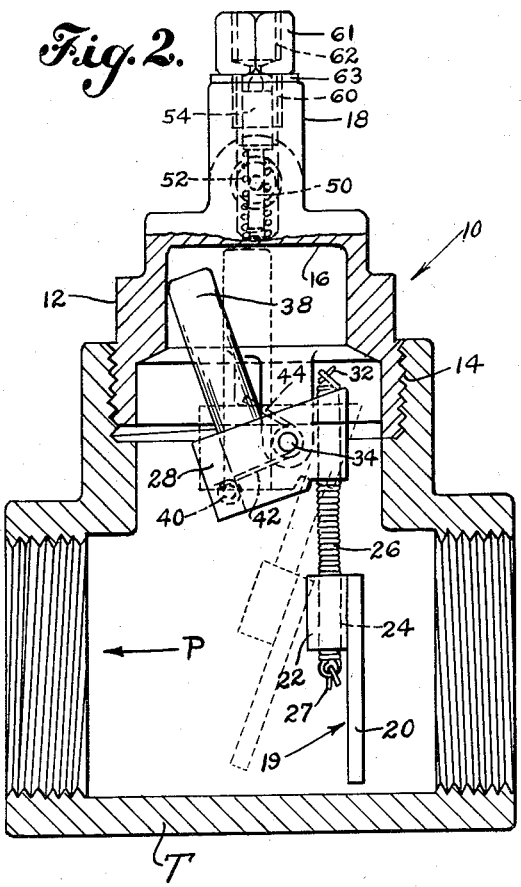
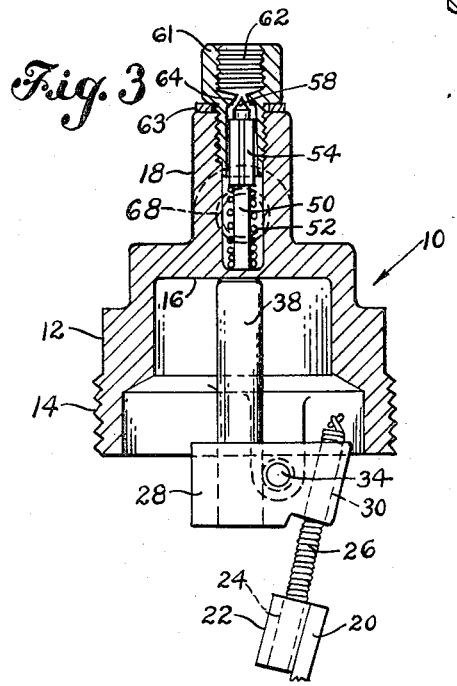
INVENTOR.
Harold J. Olson
BY Harold E. Cole
Attorney

2,842,150

VALVE DEVICE RESPONSIVE TO FLUID FLOW

Harold J. Olson, Raynham, Mass.

Application December 29, 1955, Serial No. 556,292

5 Claims. (Cl. 137—87)

This invention relates to a valve device that is actuated by the flow of fluid.

Reference is made to my Patent No. 2,752,933 dated July 3, 1956, for Valve Mechanism Responsive to the Flow of Fluid.

One object of my invention is to provide an improved device that is actuated to open position by the normal pressure of flowing liquid, and automatically returns to closed position when the flow ceases. It is especially adapted for connection to a motor and associated parts whereby a vacuum line between a vacuum diaphragm and a motor manifold, for instance, will be automatically opened by the flow of a fluid to thus increase the speed of a motor that drives a fluid pump.

My special object is to improve the mechanism and arrangement of parts that are actuated by the flow of fluid and effect the opening of a valve, especially to provide a magnet member that moves laterally to and from operative position.

A further object is to provide such a device that is simple to manufacture, easy to assemble and disassemble the parts, and relatively easy to connect to an internal combustion motor.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawing:

Fig. 1 is a front elevational view of my device shown in closed position, the housing being shown in section.

Fig. 2 is a side elevational view of said device shown in closed position and connected to a T, the dash lines indicating the actuating mechanism in open position.

Fig. 3 is a side elevational view similar to Fig. 2, with the actuating mechanism in open position, the T being omitted and the flap being shown broken away.

As illustrated, my mechanism has a supporting member shown as a main housing 10 which may be made of bronze, for instance. It has a lower portion 12 that is exteriorly screw-threaded as at 14. A solid top or partition 16 closes the upper part of said lower portion 12 and serves as a conductor. Integral with this lower portion is an upper, reduced portion 18 that provides a valve housing which is interiorly screw-threaded and separated from said lower housing portion 12 by said partition 16. Said main housing 10 can be screw-threadedly connected to a T fitting T that provides a passage P for the flow of liquid, as shown in said Fig. 2. The liquid may be fuel oil such as is commonly carried in an oil tank truck.

Connected to said main housing 10 is actuating mechanism 19, including a movable flap 20 which has a thickened or boss portion 22 having two holes 24 therethrough. Flexible connecting means, shown as two elongate coil springs 26, extend through said holes 24 at one end, being retained by a clip 27 passing through both. These coil springs 26 are firm enough to move with said flap 20 when liquid flows against the latter; but when my mechanism has moved to operative position, in case the flow further increases in pressure, said springs can yield thus neutralizing the effect of any unduly strong pressure on said mechanism.

A mounting member 28 has two holes 30 therethrough, and said coil springs 26 extend through them, being retained at this end by a clip 32. A shaft 34 is fixedly mounted in two ears 36 that are integral with said lower portion, and said shaft 34 extends laterally through said mounting member 28, which latter is rotatable on said shaft.

An elongate magnet 38 is fixedly set in said mounting member 28 and normally extends diagonally therefrom into the interior of said housing lower portion 12. An end extremity of this magnet normally bears against a side of the interior surface. A pin member 40 is set in said mounting member 28 and extends outwardly, and against which bears an end portion 42 of a tension spring. This spring extends around said shaft 34 and its other end portion 44 bears against an interior portion of said housing lower portion 12, thus keeping said magnet 38 extending diagonally in normal position, as shown in said Fig. 2.

Integral with and extending into the interior of said housing lower portion 12 is a stop member 46, against which said mounting member 28 strikes, when said magnet 38 reaches operative position. Then it barely touches, or is closely adjacent to, said housing partition 16, as shown in dash lines in Fig. 2.

The interior of said upper housing portion 18 movably receives valve mechanism, including an elongate valve member that is responsive to magnetic force, and which has an inner, elongate portion 50 that is surrounded by a coil spring 52. This spring is normally slightly longer than said inner portion 50, hence it normally bears against the outer or upper surface of said solid partition 16, thus keeping said valve member normally spaced from said partition. Said valve member has an outer, elongate portion 54 that is triangular in cross section and adjoins said inner portion 50, thus providing a shoulder 56 against which one end of said coil spring 52 bears.

Extending outwardly from said outer portion 54 is a needle valve point 58 that tapers outwardly, and which extends into the interior of a part of said housing upper portion that is shown as a removable connector or fitting. The latter has an inner attaching portion 60 that is exteriorly screw-threaded to thereby connect with the interior screw threads of said housing upper portion 18. Said connector has an outer attaching portion 61 that is interiorly screw-threaded and it provides a conduit 62 that may communicate with a motor manifold, for instance. A washer 63 lies between said upper portion 18 and said attaching portion 62.

Within said valve connector a valve seat 64 is provided through which an orifice 66 extends that tapers outwardly, so that said tapering valve point 58 may enter the wider part of the orifice and effectively seat within this tapering hole to thereby close the valve mechanism.

Said upper housing portion 18 has an interiorly screw-threaded opening 68 extending laterally and in communication with the interior of said upper portion 18 by means of a reduced passage 70. This opening 68 may be connected to a well known vacuum diaphragm, for instance.

My mechanism may be used to automatically speed the pumping of oil from an automobile tank truck, having the usual motor that drives a pump. In such use the motor starts at idling speed and operates the pump to cause some oil to flow through the supply passage P. The oil flows against said flap 20 which sets said actuating mechanism 19 in motion, bringing said magnet 38 under and adjacent said partition 16. This compresses said spring 52 as it draws the valve member downwardly by magnetism, to said partition 16, thus moving said needle valve point 58 away from its seat in said orifice 66. Thus an open passage is provided through said valve fitting, housing upper portion 18 and the conduits 62 and 68.

As a practical example the conduit 62 may connect with a well known vacuum diaphragm of an internal combustion motor having a control member that is connected to the carburetor throttle, and the conduit 68 may connect with a motor manifold. Upon establishing a vacuum between and through conduit 68 and orifice 66, the vacuum diaphragm mechanism blade is actuated which can open said throttle to a predetermined position to thereby increase the motor speed and thus to operate the oil pump at the most efficient pumping speed.

When the flow of liquid ceases, the actuating mechanism automatically returns to normal position, and with the movement of said magnet 38 away from said partition 16, said spring 52 expands somewhat to resume its normal position, and said valve member being freed from the magnetic force, is forced upwardly by the spring 52 so that said needle point 58 closes said orifice 66.

What I claim is:

1. A valve device comprising a housing embodying a lower portion, an upper portion, and a conductor partition separating said housing portions, actuating mechanism connected to said housing lower portion, and valve mechanism movable in said housing upper portion, said actuating mechanism embodying a flap, a mounting member, connecting means attached to and extending between said flap and mounting member, a portion of said mounting member normally extending diagonally and laterally from said means, means supported by said housing movably supporting said mounting member, a magnet fixed to said mounting member laterally extending portion and extending at substantially a right angle thereto into said upper portion, means between said mounting member and housing normally holding said actuating mechanism in inoperative position, said valve mechanism embodying a valve member responsive to magnetic force and means supported by said housing upper portion normally holding said valve in closed position, said housing upper portion having an orifice therein and a valve seat surrounding said orifice, said valve member normally entering said orifice and closing it, said upper portion having two openings in communication with said orifice when said valve mechanism is in open position, said valve member and magnet being adjacent to, and at opposite sides of, said partition, when said magnet is in operative position.

2. A valve device comprising a housing comprising a lower portion, an upper portion, and a conductor partition separating said housing portions, actuating mechanism connected to said housing lower portion, valve mechanism movable in said upper portion, said actuating mechanism embodying a flap, a mounting member having a connecting portion at one side, connecting means attached to and extending between said flap and mounting member side connection portion, means supported by said housing movably supporting said mounting member, a magnet eccentrically mounted in said mounting member at a point spaced laterally from said side connector portion and normally extending diagonally towards said upper portion, means between said mounting member and housing normally holding said actuating mechanism in inoperative position, said housing upper portion embodying a hollow connector embodying a valve seat therein and an orifice extending through said seat, said valve mechanism embodying valve member normally entering said connector and orifice, and means to normally hold said valve member in closed position, said upper portion having an opening therethrough communicating with said orifice, said valve member and magnet being adjacent to, and at opposite sides of, said partition, when said magnet is in operative position.

3. A valve device comprising a housing embodying a lower portion, an upper portion, and a conductor partition separating said housing portions, actuating mechanism connected to said housing lower portion, and valve mechanism movable in said housing upper portion, said actuating mechanism embodying a flap, a mounting member, two parallel flexible members attached to said flap and to said mounting member, said mounting member normally extending at an acute angle relative to said flexible members, a magnet fixed to said mounting member and normally extending angularly relative to said two flexible members into said upper portion, a shaft supported by said lower portion, said mounting member being rotatably mounted on said shaft, said magnet being adapted to reach operative position when it is at an intermediate point of said partition, said valve mechanism embodying a valve member responsive to magnetic force and means supported by said housing upper portion normally holding said valve member in closed position, said housing upper portion having an orifice therein, and a valve seat surrounding said orifice, said valve member normally entering said orifice and closing it, said upper portion having two openings which communicate with said orifice when said valve member is in open position, said valve member and magnet being adjacent to, and at opposite sides of, said partition, when said magnet is in operative position.

4. A valve device comprising a housing embodying a lower portion, an upper portion, and a conductor partition separating said housing portions, actuating mechanism connected to said housing lower portion, and valve mechanism movable in said housing upper portion, said actuating mechanism embodying a flap having two holes therein, a mounting member having two holes therein at a side portion thereof, two spring members normally extending vertically and into said flap holes and attached to said flap, and extending into said mounting member holes and attached to said mounting member, a magnet fixed to said mounting member laterally of said side portion and normally extending therefrom diagonally relative to said spring members towards said upper portion, a shaft supported by said lower portion, said mounting member being rotatably mounted on said shaft, said lower portion embodying a stop member so positioned that said mounting member contacts it when said magnet reaches operative position adjacent an intermediate point of said partition, said valve mechanism embodying a valve member responsive to magnetic force and means supported by said housing upper portion normally holding said valve member in closed position, said housing upper portion having an orifice therein and a valve seat surrounding said orifice, said valve member normally entering said orifice and closing it, said upper portion having two openings which communicate with said orifice when said valve member is in open position, said valve member and magnet being adjacent to, and at opposite sides of, said partition, when said magnet is in operative position.

5. A valve device comprising a housing embodying a lower portion, an upper portion, and a conductor partition separating said housing portions, actuating mechanism connected to said housing lower portion, and valve mechanism movable in said housing upper portion, said actuating mechanism embodying a flap having two holes therein, a mounting member having two holes therein at a side portion thereof, two flexible members normally extending vertically and through said flap holes and attached to said flap, and extending through said mounting member holes and attached to said mounting member, an elongate magnet fixed to said mounting member laterally of said side portion and normally extending therefrom diagonally relative to said spring members into said upper portion, a shaft supported by said lower portion, said mounting member being rotatably mounted on said shaft, said lower portion embodying a stop member so positioned that said mounting member contacts it when said magnet reaches operative position at a point closely adjacent an intermediate point of said partition, said valve mechanism embodying a valve member responsive to magnetic force and means supported by said housing upper portion normally holding said valve member in closed position, said housing upper portion having an orifice therein and a valve seat surrounding said orifice, said valve member normally entering said orifice and closing it, said upper portion having two openings which communicate with said orifice when said valve member is in open position, said valve member and magnet being adjacent to, and at opposite sides of, said partition, when said magnet is in operative position.

References Cited in the file of this patent

UNITED STATES PATENTS

| | | |
|---|---|---|
| 1,612,017 | Hastings | Dec. 28, 1926 |
| 1,894,367 | Corcoran | Jan. 17, 1933 |
| 2,037,575 | Hamilton et al. | Apr. 14, 1936 |
| 2,752,933 | Olson | July 3, 1956 |